US010898889B2

(12) United States Patent
Price et al.

(10) Patent No.: US 10,898,889 B2
(45) Date of Patent: Jan. 26, 2021

(54) SCR CATALYST AND EXHAUST GAS CLEANING SYSTEM

(71) Applicant: UMICORE AG & CO. KG, Hanau-Wolfgang (DE)

(72) Inventors: Kenneth Sherwood Price, Brighton, MI (US); Anke Schuler, Niedernberg (DE); Michael Seyler, Mainaschaff (DE); Frank-Walter Schütze, Aschaffenburg (DE); Marcus Pfeifer, Solingen (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 9 days.

(21) Appl. No.: 15/877,691

(22) Filed: Jan. 23, 2018

(65) Prior Publication Data
US 2019/0226372 A1 Jul. 25, 2019

(51) Int. Cl.
*B01J 35/00* (2006.01)
*B01D 53/94* (2006.01)
*F01N 3/035* (2006.01)
*B01D 46/00* (2006.01)
*B01J 29/76* (2006.01)
*F01N 3/20* (2006.01)
*F01N 3/10* (2006.01)

(52) U.S. Cl.
CPC ...... *B01J 35/0006* (2013.01); *B01D 46/0027* (2013.01); *B01D 53/944* (2013.01); *B01D 53/9418* (2013.01); *B01D 53/9477* (2013.01); *B01J 29/763* (2013.01); *F01N 3/035* (2013.01); *F01N 3/2066* (2013.01); *B01D 2251/2062* (2013.01); *B01D 2251/2067* (2013.01); *B01D 2255/1023* (2013.01); *B01D 2255/2065* (2013.01); *B01D 2255/20761* (2013.01); *B01D 2255/50* (2013.01); *B01D 2255/903* (2013.01); *B01D 2255/915* (2013.01); *B01D 2258/012* (2013.01); *B01D 2279/30* (2013.01); *F01N 3/103* (2013.01); *F01N 2250/02* (2013.01); *F01N 2510/063* (2013.01); *F01N 2570/14* (2013.01)

(58) Field of Classification Search
None
See application file for complete search history.

(56) References Cited

U.S. PATENT DOCUMENTS

| 3,741,725 | A | * | 6/1973 | Graham | B01D 53/944 |
| | | | | | 423/213.5 |
| 6,709,644 | B2 | | 3/2004 | Zones et al. | |
| 8,220,251 | B2 | * | 7/2012 | Oger | B01D 53/945 |
| | | | | | 60/286 |
| 8,617,474 | B2 | | 12/2013 | Bull et al. | |
| 8,753,596 | B2 | | 6/2014 | Spurk et al. | |
| 8,926,925 | B2 | | 1/2015 | Soeger et al. | |
| 10,213,767 | B2 | | 2/2019 | Reith et al. | |
| 10,443,463 | B2 | | 10/2019 | Hoyer et al. | |
| 2010/0061903 | A1 | * | 3/2010 | Kohara | B01D 53/9468 |
| | | | | | 423/213.2 |
| 2011/0020204 | A1 | * | 1/2011 | Bull | B01D 53/9418 |
| | | | | | 423/239.2 |
| 2013/0340414 | A1 | * | 12/2013 | Bergeal | B01J 23/96 |
| | | | | | 60/299 |
| 2014/0219879 | A1 | * | 8/2014 | Bull | B01D 53/9418 |
| | | | | | 422/170 |
| 2014/0328738 | A1 | * | 11/2014 | Chandler | B01J 37/0246 |
| | | | | | 423/213.2 |
| 2015/0023853 | A1 | * | 1/2015 | Wittrock | B01D 53/9454 |
| | | | | | 423/212 |
| 2015/0037221 | A1 | * | 2/2015 | Shibata | F01N 3/0222 |
| | | | | | 422/177 |
| 2015/0037233 | A1 | | 2/2015 | Fedeyko et al. | |
| 2016/0107150 | A1 | | 4/2016 | Thomas et al. | |
| 2016/0136626 | A1 | * | 5/2016 | Phillips | B01D 53/9477 |
| | | | | | 423/239.2 |
| 2016/0236180 | A1 | * | 8/2016 | Hoyer | B01D 53/944 |
| 2016/0367941 | A1 | * | 12/2016 | Gilbert | B01D 53/9436 |
| 2016/0367974 | A1 | | 12/2016 | Larsson | |
| 2017/0051654 | A1 | * | 2/2017 | Gupta | F01N 3/035 |
| 2017/0067387 | A1 | * | 3/2017 | Khaled | F01N 13/0093 |
| 2017/0087541 | A1 | * | 3/2017 | Andersen | B01D 53/8628 |

(Continued)

FOREIGN PATENT DOCUMENTS

| DE | 10 2015 117311 A1 | 4/2016 |
| DE | 10 2015 119913 A1 | 5/2016 |

(Continued)

OTHER PUBLICATIONS

DIN 66132:Bestirnmung der spezifischen Oberfläche von Feststoffen durch Stickstoffadsorption; Einpunkt-Differenzverfahren nach Haul und Dümbgen. [Determination of specific surface area of solids by adsorption of nitrogen; single-point differential method according to Haul and Dümbgen.] Standard by Deutsches Institut Fur Normung E.V. [German National Standard], 1975. 5 pages in German (with English machine translation).

Mayer, T. Festoff-SCR-System auf Basis von Ammomum-Carbamat, Dissertation, Technical University of Kaiserslatern, Germany 2005. 157 pages.

Baerlocher, et al. Atlas of Zeolite Pramewolk Types. 5th revised edition, 2001: ISBN: 0-444-50701-9, pp. 1-303.

International Search Report dated Mar. 19, 2019 for International Patent Application No. PCT/EP2019/051022 (4 pages).

Written Opinion of the International Searching Authority dated Mar. 19, 2019 for International Patent Application No. PCT/EP2019/051022 (6 pages).

*Primary Examiner* — Sheng H Davis

(74) *Attorney, Agent, or Firm* — Smith, Gambrell & Russell, LLP

(57) ABSTRACT

The present invention relates to a SCR catalyst comprising a carrier substrate of the length L, which is a flow-through substrate, and a coating A which comprises a small pore zeolite, copper and palladium.

19 Claims, 1 Drawing Sheet

(56) References Cited

U.S. PATENT DOCUMENTS

2017/0321590 A1* 11/2017 Di Perna ................. F01N 3/101
2019/0351398 A1 11/2019 Nunan et al.

FOREIGN PATENT DOCUMENTS

| DE | 10 2016 111147 A1 | 12/2016 |
| JP | H04-267950 A | 12/2016 |
| WO | 2005/016497 A1 | 2/2005 |
| WO | 2008/106519 A1 | 9/2008 |
| WO | 2008/118434 A1 | 10/2008 |
| WO | 2008/132452 A2 | 11/2008 |

* cited by examiner

SCR CATALYST AND EXHAUST GAS CLEANING SYSTEM

The present invention relates to a SCR catalyst which can be used in a close-coupled position as well as to an exhaust gas cleaning system comprising a close coupled SCR catalyst.

The exhaust gas of motor vehicles that are operated with lean-burn combustion engines, such as diesel engines, contain carbon monoxide (CO), nitrogen oxides (NOx) as well as components that result from the incomplete combustion of the fuel in the combustion chamber of the cylinder. These include residual hydrocarbons (HC), which are usually also predominantly present in gaseous form, and particle emissions, also referred to as "diesel soot" or "soot particles." The latter are complex agglomerates from predominantly carbonaceous particulate matter and an adhering liquid phase, which usually preponderantly consists of longer-chained hydrocarbon condensates. The liquid phase adhering to the solid components is also referred to as "Soluble Organic Fraction SOF" or "Volatile Organic Fraction VOF."

To clean these exhaust gases, the aforementioned components must be converted to harmless compounds as completely as possible. This is only possible with the use of suitable catalysts.

A known method for the removal of nitrogen oxides contained in exhaust gas in the presence of oxygen is the selective catalytic reduction with ammonia in the presence of an SCR catalyst. This method comprises conversion of nitrogen oxides to be removed from the exhaust gas with ammonia as reductant into nitrogen and water.

Suitable SCR catalysts are for example zeolites which are ion-exchanged with iron and in particular with copper, see for example WO2008/106519 A1, WO2008/118434 A1 and WO2008/132452 A2.

SCR catalysts for the conversion of nitrogen oxides with ammonia do usually not comprise noble metals, in particular no platinum. This is because in the presence of these metals the oxidation of ammonia with oxygen to nitrogen oxides would be preferred and the SCR reaction (conversion of ammonia with nitrogen oxide) would fall behind. In literature, some authors speak from platinum-exchanged "SCR catalysts". However, this doesn't refer to the $NH_3$—SCR-reaction but to the reduction of nitrogen oxides with hydrocarbons. As the selectivity of the latter reaction is very limited, it would be more correct to call it "HC-DeNOx-reaction" instead of "SCR reaction".

The ammonia used in the SCR reaction can be made available via feeding of an ammonia precursor, such as urea, ammonium carbamate or ammonium formate, into the exhaust gas line and subsequent hydrolysis.

Current Diesel aftertreatment systems for low emissions applications typically consist of a Diesel oxidation catalyst (DOC), followed by a catalyzed Diesel particulate filter (cDPF) and an SCR catalyst. In this system the temperature of the SCR catalyst early in the cycle, for example during cold start, is limited by the thermal mass of the components, particularly the cDPF, ahead of it delaying the transfer of heat energy.

One solution is to combine the SCR catalyst and the particulate filter, thus making an SDPF (SCR on DPF), also known as an SCRF (SCR on Filter), see for example WO2005/016497 A1.

However, in this configuration, the process of active regeneration (burning) by high temperature exposure of soot collected in the SDPF causes either a loss of NOx control of the system if the filter regeneration temperature is high enough for good, fast cleanout (above ~575° C.) where the SCR conversion of the SDPF is poor, or the regeneration time/completeness is reduced by operation at a temperature where some SCR conversion within the SDPF is possible but soot regeneration poor (below ~525° C.).

Another solution to this problem is a two stage system where an extra SCR catalyst with its own urea or ammonia supply is placed ahead of the DOC and the rest of the system so it gets warm much sooner than the primary SCR downstream of the cDPF. Of the various types of SCR catalysts that can be considered are vanadium and copper based catalysts for this close coupled location. Vanadium has the advantage that it does not need to have pre-stored ammonia on a cold start and it is not sulfur sensitive. However, it has poor low temperature NOx conversion without enhancement by $NO_2$ which is typically provided by having it placed behind a DOC and/or cDPF. Copper based SCR catalysts have much better low temperature conversion without $NO_2$ assistance, but are susceptible to sulfur poisoning and need to be periodically desulfated at temperatures above 400-500° C. depending on the type. Normally if it is downstream of a DOC and/or cDPF, fuel can be burned in the device(s) ahead of it to provide additional temperature if the normal engine operation is not hot enough, often in conjunction with a DPF regeneration.

However if a copper based SCR catalyst is placed ahead of the rest of the system, then heat can't be generated by fuel burned in a device ahead of it.

Modern small pore zeolite SCR catalysts with good low temperature conversion properties and low $N_2O$ formation also don't burn fuel effectively, so fuel injected into it will not desulfate the SCR catalyst by internal thermal release. As a consequence these SCR catalysts can't be used close coupled.

Accordingly, there is still need for a technical solution which provides sufficient NOx conversion at low temperatures like for example during cold start.

It has now been surprisingly found that a SCR catalyst based on a small pore zeolite and copper which comprises a certain amount of palladium can solve this problem.

Accordingly, the present invention pertains to a SCR catalyst comprising
 a carrier substrate of the length L, which is a flow-through substrate, and
 a coating A which comprises a small pore zeolite, copper and palladium. Zeolites are two- or three-dimensional structures which consist of $SiO_4$— and $AlO_4$-tetrahedrons as smallest structural units. Such tetrahedrons combine into bigger structures, wherein each two are connected via a common oxygen atom. This results in rings of different size, for example rings of four, six or more tetrahedral silicon- or aluminum atoms. The different zeolite types are frequently defined via the ring size because this size determines which guest molecule can enter the zeolite structure and which not. It is common to distinguish large pore zeolites with a maximum ring size of 12, medium pore zeolites with a maximum ring size of 10 and small pore zeolites with a maximum ring size of 8.

In addition, the Structure Commission of the International Zeolite Association classifies zeolites into structure types, each of which has a three letter code, see for example Atlas of Zeolite Framework Types, Elsevier, sixth revised edition, 2007.

Accordingly, small pore zeolites as used according to the present invention have a maximum ring size of 8 tetrahedral atoms.

In embodiments of the present invention coating A comprises a small pore zeolite belonging to a framework type having the framework type code AEI, AFX, CHA, ERI, KFI or LEV.

Zeolites of the framework type AEI are for example SSZ-39 and AlPO-18. A zeolite of the framework type AFX is for example SAPO-56. Zeolites of the framework type CHA are for example SSZ-13, SAPO-34, LZ-218, ZK-14 and chabazite. Zeolites of the framework type ERI are for example ZSM-34, LZ-220 and SAPO-17. A zeolite of the framework type KFI is for example ZK-5. Zeolites of the framework type LEV are for example Levyne, LZ-132, Nu-3, ZK-20 and SAPO-35.

Within the context of the present invention the term zeolites comprises molecular sieves which are sometimes called "zeolite-like". Molecular sieves are preferred if they belong to one of the above mentioned structure codes. Examples are silicaaluminumphosphate-zeolites, which are known as SAPO and aluminumphosphate-zeolites, which are known as AlPO.

In addition, preferred zeolites have a SAR (silica-to-alumina ratio) value of 2 to 100, in particular 5 to 50.

In embodiments of the present invention coating A comprises copper in an amount of 1 to 20% by weight based on the weight of the small pore zeolite and calculated as CuO. In particular the amount of copper is 1 to 10% by weight or preferred 2 to 6% by weight based on the weight of the small pore zeolite and calculated as CuO.

The copper is in particular present within the zeolite structure as copper cation, i.e. in ion exchanged form. In addition, the copper can completely or partly be present in form of copper oxide within the zeolite structure and/or on the surface of the zeolite structure.

In embodiments of the present invention coating A comprises palladium in an amount of 0.003 to 2% by weight based on the weight of the small pore zeolite and calculated as palladium metal, for example 0.005 to 1.5, 0.007 to 1 or 0.009 to 0.5% by weight. In particular, the amount of palladium is 0.04 to 0.1 and preferred 0.06 to 0.08% by weight based on the weight of the small pore zeolite and calculated as palladium metal.

The palladium is in particular present within the zeolite structure as palladium cation, i.e. in ion exchanged form. In addition, the palladium can completely or partly be present in form of palladium metal and/or in form of palladium oxide within the zeolite structure and/or on the surface of the zeolite structure.

In embodiments of the present invention coating A comprises in addition to the small pore zeolite, copper and palladium cerium, particularly in the form of ceria ($CeO_2$) or in form of a cerium/zirconium mixed oxide In this case the amount of ceria and cerium/zirconium mixed oxide, respectively, is in particular 10 to 80 g/L, based on the volume of the carrier substrate.

In embodiments of the present invention coating A is present in an amount of 50 to 300 g/L, in particular 100 to 250 g/L, based on the volume of the carrier substrate.

The carrier substrates used according to the present invention are for example usual flow-through substrates made of cordierite or metal. Such carrier substrates are described in literature and available on the market.

Alternatively, the carrier substrates according to the present invention are so-called corrugated substrates. These are in particular honeycomb shaped, formed of corrugated sheets and have open channels so that the exhaust gas can directly flow through.

Corrugated substrates comprise in particular non-woven material, for example E-glass fibers, which is coated with a ceramic material prior to corrugating and forming it into a corrugated sheet. The ceramic material comprises preferably titania, silica and/or kaolin.

A honeycomb shaped substrate is formed by stacking up a plurality of the coated and corrugated sheets into a rectangular or cylindrical body. Such body has a plurality of parallel flow through channels formed by waves of the corrugated sheet(s).

Figure 1:
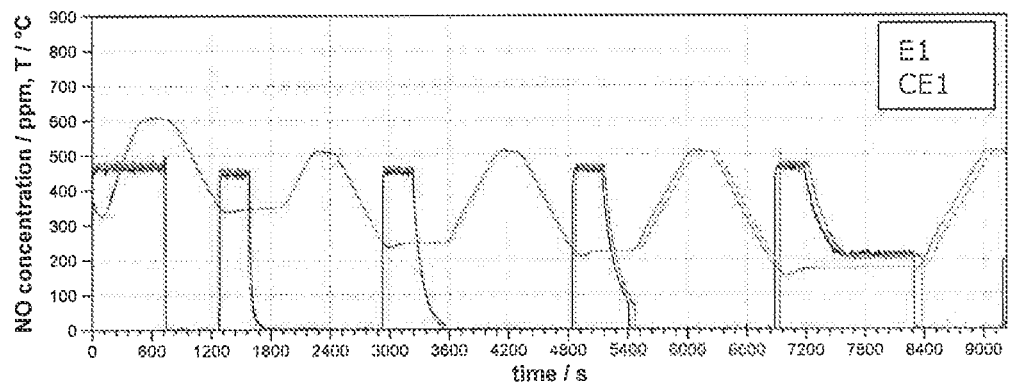
FIG. 1 shows the test results for the component NO.

Coating A comprising a small pore zeolite, copper and palladium usually extends to the total length L of the carrier substrate. However, in embodiments of the present invention coating A extends only to a part of the length L. In that case there can be one or more additional catalytically active coatings on the carrier. For example, there can be coating B which comprises a small pore zeolite and copper but is free of palladium. In particular, coating A and B only differ in the absence of palladium in coating B.

Coatings A and B can be arranged on the carrier substrate in different manner. In one embodiment coating A extends starting from one end of the carrier substrate to 10 to 80% of the length L and coating B extends starting from the other end of the carrier substrate to 20 to 90% of the length L. Usually $L=L_A+L_B$ applies wherein $L_A$ is the length of coating A and $L_B$ is the length of coating B.

When in use, coating A is to be arranged upstream and coating B downstream.

SCR catalysts according to the present invention can be manufactured by known methods, for example in accordance with the customary dip coating methods or pump and suck coating methods with subsequent thermal post-treatment (calcination and possibly reduction using forming gas or hydrogen). These methods are sufficiently known from the prior art. Accordingly, in a first step a washcoat is prepared which comprises the small pore zeolite, copper and palladium which is in a second step coated onto the carrier substrate.

In embodiments of the present invention the SCR catalyst is connected with a dosing unit for reductant.

Suitable dosing units can be found in literature (see for example T. Mayer, Feststoff-SCR-System auf Basis von Ammonium-carbamat, Dissertation, Technical University of Kaiserslautern, Germany, 2005) and the skilled person can select any of them. The ammonia can be dosed into the exhaust gas flow as such or in form of a precursor which forms ammonia at the ambient conditions of the exhaust gas flow. Suitable precursors are for example aqueous solutions of urea or ammonium format, as well as solid ammonium carbamate. The reductant and its precursor, respectively, is usually carried in a storage tank which is connected to the dosing unit.

The present invention therefore also pertains to a system comprising a SCR catalyst comprising
  a carrier substrate of the length L, which is a flow-through substrate, and
  a coating A which comprises a small pore zeolite, copper and palladium and a dosing unit for reductant.

When in use the inventive system is arranged into the exhaust gas stream so that the dosing unit is upstream of the SCR catalyst.

The SCR catalyst of the present invention has increased ability to oxidize hydrocarbons above 300° C. primarily for the purpose of generating sufficient internal exotherm to reach a temperature which allows its desulfation. Surprisingly, this has no detrimental effect on or even enhances low temperature SCR performance. With other words, the SCR catalyst provides sufficient NOx conversion early in the cycle, for example during cold start. In addition to the self desulfation, the heated exhaust, potentially with some or a significant portion of hydrocarbons still present, enables the downstream DOC and cDPF to undergo an active soot regeneration with or without additional fuel.

It is in particular surprising that the ability of the inventive SCR catalyst to oxidize hydrocarbons, doesn't increase oxidation of ammonia, particularly below 300° C.

The inventive SCR catalyst is therefore in particular suitable as a close coupled SCR catalyst. This means that when in use there is no catalyst upstream of the inventive SCR catalyst.

The present invention therefore also pertains to an exhaust gas cleaning system comprising in the following order
  a first dosing unit for reductant,
  a first SCR catalyst comprising,
    a carrier substrate of the length L, which is a flow-through substrate, and
    a coating A which comprises a small pore zeolite, copper and palladium
  an oxidation catalyst,
  a particulate filter,
  a second dosing unit for reductant and
  a second SCR catalyst.

In an embodiment of the inventive exhaust gas cleaning system the oxidation catalyst and the particulate filter are combined to form a catalyzed particulate filter (cDPF).

In another embodiment of the inventive exhaust gas cleaning system the particulate filter and the second SCR catalyst are combined to form a so-called SDPF. In this case the second dosing unit is arranged upstream of the SDPF.

In a further embodiment of the inventive exhaust gas cleaning system the oxidation catalyst comprises a noble metal, like for example platinum, palladium or platinum and palladium, on a carrier material. In the latter case the weight ratio of platinum and palladium is for example 4:1 to 14:1. As carrier material all materials can be used which are known to the skilled person for that purpose. Usually, they have a BET surface of 30 to 250 m$^2$/g, preferably of 100 to 200 m$^2$/g (determined according to German standard DIN 66132) and are in particular alumina, silica, magnesia, titania, as well as mixtures or mixed oxides comprising at least two of these materials.

Preferred are alumina, alumina/silica mixed oxides and magnesia/alumina mixed oxides. In case alumina is used, it is preferably stabilized, for example with 1 to 6 weight percent, in particular 4 weight percent, of lanthana.

The oxidation catalyst is usually present in form of a coating on a carrier substrate, in particular a flow-through substrate made of cordierite or metal.

In case the oxidation catalyst is combined with the particulate filter the oxidation catalyst is present in form of a coating on the particulate filter which is usually a wall flow filter substrate made of cordierite.

The second SCR catalyst of the inventive exhaust gas cleaning system can principally be selected from all catalysts which are active in catalyzing the SCR reaction of nitrogen oxides with ammonia. This is in particular true because the first SCR catalyst, which when in use is arranged close coupled, has good performance at low operating temperatures and therefore relieves the second SCR catalyst of the need to have good low temperature performance. Accordingly, it is preferred to use a second SCR catalyst with good performance at moderate temperatures and available $NO_2$ for the control of $N_2O$, without compromising overall low temperature system performance. This enables the use of SCR catalysts of the mixed oxide type, which for example comprise vanadium, tungsten and titanium, as well as of catalysts on the basis of zeolites, in particular zeolites which are exchanged with transition metals, in particular with copper, iron or iron and copper.

In embodiments of the present invention the second SCR catalyst comprises small pore zeolites with a maximum ring size of eight tetrahedral atoms and a transition metal, for example copper, iron or copper and iron. Such SCR catalysts are for example disclosed in WO2008/106519 A1, WO2008/118434 A1 and WO2008/132452 A2.

In addition, large and medium pore sized zeolites which are exchanged with transition metals can be used as well. Of interest are in particular zeolites belonging to the structure code BEA.

In particular preferred zeolites belong to the structure codes BEA, AEI, CHA, KFI, ERI, LEV, MER or DDR and are in particular ion-exchanged with copper, iron or copper and iron.

The zeolites comprise transition metal in particular in an amount of 1 to 10 weight percent, preferred 2 to 5 weight percent, calculated as metal oxide, like for example $Fe_2O_3$ or CuO.

In preferred embodiments of the present exhaust gas cleaning system the second SCR catalyst comprises zeolites or molecular sieves of the Beta-type (BEA), Chabazite-type (CHA) or Levyne-type (LEV). Such zeolites or molecular sieves are for example known as ZSM-5, Beta, SSZ-13, SSZ-62, Nu-3, ZK-20, LZ-132, SAPO-34, SAPO-35, AlPO-34 and AlPO-35, see for example U.S. Pat. Nos. 6,709,644 and 8,617,474.

The inventive exhaust gas cleaning system optionally contains as an additional element a so-called ammonia slip catalyst (ASC). The purpose of an ammonia slip catalyst is to oxidize ammonia which breaks through an SCR catalyst and thus to avoid its release to atmosphere. Consequently, an ammonia slip catalyst is coated on a separate carrier substrate and located downstream of the second SCR catalyst or it is coated on a downstream part of the second SCR catalyst.

In embodiments of the inventive exhaust gas cleaning system the ammonia slip catalyst comprises one or more platinum group metals, in particular platinum or platinum and palladium.

The present invention in addition pertains to a process for cleaning exhaust gas emitted from a lean burn engine and containing nitrogen oxides, which process comprises passing the exhaust gas stream through an exhaust gas cleaning system comprising in the following order
  a first dosing unit for reductant,
  a first SCR catalyst comprising,
    a carrier substrate of the length L, which is a flow-through substrate, and
    a coating A which comprises a small pore zeolite, copper and palladium
  an oxidation catalyst,
  a particulate filter,
  a second dosing unit for reductant and
  a second SCR catalyst.
wherein the first dosing unit for reductant and the first SCR catalyst are arranged close coupled and wherein the oxidation catalyst, the particulate filter, the second dosing unit for reductant and the second SCR catalyst are arranged underfloor and wherein the exhaust gas enters the exhaust gas cleaning system before the first dosing unit for reductant and leaves it after the second SCR catalyst.

The inventive method can be fine-tuned depending on the temperature of certain components of the exhaust gas cleaning system in particular via dosing of reductant, for example as follows.

In case the temperature of the second SCR catalyst (in underfloor position) is between about 200 and 225° C., the urea dosing at the first dosing unit (in close coupled position) is preferably done to optimize ammonia storage and NOx conversion taking into account of the need to limit ammonia slip oxidation over the downstream oxidation catalyst.

In case the temperature of the first SCR catalyst (in close coupled position) is between about 225 and 275° C. where passive soot oxidation in the downstream cDPF may not be significant, the urea dosing at the first dosing unit (in close coupled position) is preferably controlled to maintain a certain minimum ammonia storage, maximize overall system performance while minimizing formation of $N_2O$ of the complete exhaust gas cleaning system. In case the temperature of the first SCR catalyst (in close coupled position) is above about 275° C., the urea dosing at the first dosing unit (in close coupled position) is preferably minimized or stopped completely to enable adequate passive soot oxidation while the second SCR catalyst (in underfloor position) is at full conversion potential.

When the first SCR catalyst (in close coupled position) needs to be desulfated, engine measures are to be taken to raise the exhaust gas temperature to about 300 to 350° C., and preferably late in-cylinder post injection of fuel is applied so that the first SCR catalyst (in close coupled position) oxidizes some of this cracked, partially oxidized hydrocarbon to reach the internal desulfation temperature target of about 400 to 450° C. Hydrocarbon slip from the first SCR catalyst (in close coupled position) is oxidized in the DOC and/or cDPF, and can be supplemented with in-exhaust injected diesel fuel downstream of the first SCR catalyst (in close coupled position) to accomplish a cDPF regeneration at the same time. If sufficient NOx conversion is achieved with the first SCR catalyst (in close coupled position) while undergoing desulfation, the downstream cDPF can be aggressively regenerated without regard to the need to stay in the good SCR conversion temperature window below about 550 to 600° C. If insufficient NOx conversion is available from the first SCR catalyst (in close coupled position), the second SCR catalyst (in underfloor position) is preferably kept in a temperature range where better SCR conversion is available, below about 500° C.

When a cDPF regeneration is needed but the first SCR catalyst (in close coupled position) doesn't need to be desulfated, NOx conversion can be provided by the first SCR catalyst (in close coupled position) only, and fuel injected primarily downstream of it will be used to accomplish the cDPF regeneration. However, fuel burning in the first SCR catalyst (in close coupled position) can still be desirable to raise the DOC or cDPF inlet temperature to enhance its fuel burning, and it can be advantageous to always combine the desulfation and DPF regeneration to manage the condition of both.

EXAMPLE 1 a) A zeolite of the type SSZ-13 (framework type code CHA) containing copper in an amount of 3.85% by weight based on the weight of the zeolite and calculated as CuO was suspended in water.

b) Palladium in form of palladium nitrate was precipitated on a commercially available alumosilica carrier material to a weight of palladium of 1.4% by weight.

c) The zeolite containing slurry obtained in step a) above was mixed with demineralised water, then the palladium containing powder obtained in step b) above was added in an amount, that 30 ppm of palladium is achieved. Next, the slurry obtained is mixed with 12% by weight of a commercially available binder based on boehmite and milled in a ball mill. Subsequently, the washcoat obtained was coated on a commercially available flow through substrate of cordierite at a loading of 200 g/L.

d) The SCR catalyst obtained in step c) above (hereinafter called Catalyst E1) was combined with a commercially available dosing unit for dosing of aqueous solution of urea.

Comparison Example 1

Example 1 was repeated with the exception that step b) was omitted. The catalyst obtained is hereinafter called Catalyst CE1.

Experiments

Catalysts E1 and CE1 were characterized in a test procedure targeting their SCR as well as their oxidizing capability. The SCR capability was represented by the reaction of NO with $NH_3$ in the presence of oxygen (so called "standard SCR reaction") and the oxidation capability was represented by the oxidation of CO.

The test procedure was transient in terms of concentrations and temperatures. It comprised a preconditioning and a test cycle for different temperature steps. The gas mixtures applied are as follows:

| Gas Mixture | 1 | 2 | 3 |
| --- | --- | --- | --- |
| $N_2$ | Balance | Balance | Balance |
| $O_2$ | 10 Vol.-% | 10 Vol.-% | 10 Vol.-% |
| NOx | 0 ppm | 500 ppm | 500 ppm |
| $NO_2$ | 0 ppm | 0 ppm | 0 ppm |
| $NH_3$ | 0 ppm | 0 ppm | 750 ppm |
| CO | 350 ppm | 350 ppm | 350 ppm |
| $C_3H_6$ | 100 ppm | 100 ppm | 100 ppm |
| $H_2O$ | 5 Vol.-% | 5 Vol.-% | 5 Vol.-% |
| GHSV/h−1 | 60.000 | 60.000 | 60.000 |

Test procedure:
1. Preconditioning at 600° C. under $N_2$ for 10 min, in parallel identify exact gas concentrations (gas mixture 3) via bypass line.
2. Test cycle, which is repeated for each target temperature (in this case 350, 250, 225 and 175° C.)
   a. Go to target temperature using gas mixture 1
   b. Add NOx (gas mixture 2)
   c. Add $NH_3$ (gas mixture 3), wait until a break-through of 20 ppm $NH_3$ is reached
   d. Temperature programmed desorption until 500° C. is reached (gas mixture 3)

Figure 2:
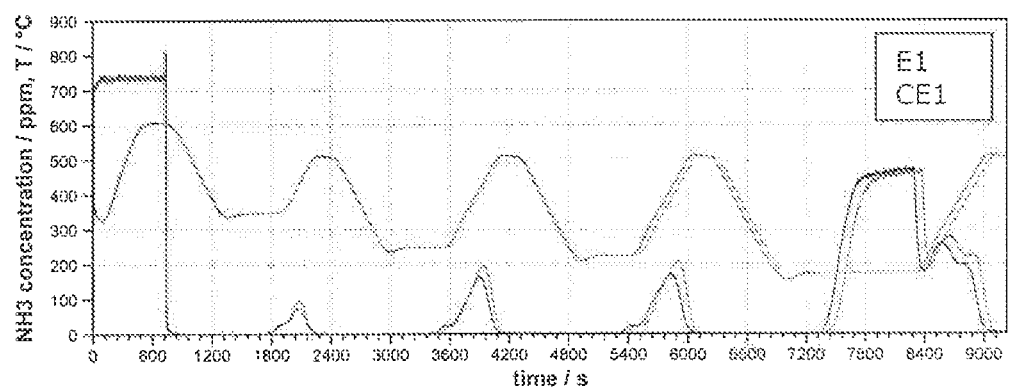
FIG. 2 shows the test results fot the component NH3.
Figure 3:
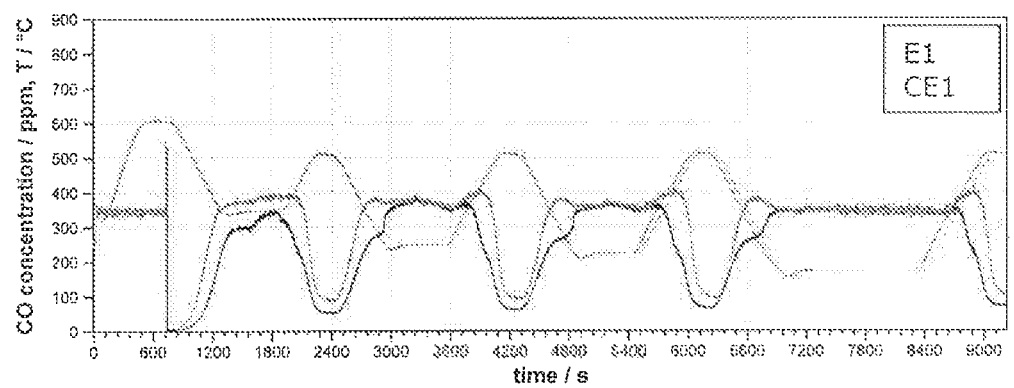
FIG. 3 shows the test results for the component CO.

The test results are shown in FIG. 1 for the component NO, in FIG. 2 for the component NH3 and in FIG. 3 for the component CO.

As the emission data of NO and $NH_3$ are nearly identical for E1 and CE1 (see FIG. 1 and FIG. 2), the SCR Reaction capability of catalysts E1 and CE1 are the same.

As the CO emissions of E1 are clearly reduced when compared to the CO emissions of CE1 (see FIG. 3), the addition of palladium in E1 results in an improvement of the oxidation capability. This can be used for the heat up function as well as for the catalyst's self desulfation capability.

EXAMPLE 2

The SCR catalyst obtained in Example 1d) above was integrated into an exhaust gas cleaning system by adding to the SCR catalyst at the opposite side of the dosing unit
- a commercially available wall flow filter of cordierite coated with 100 g/L based on the volume of the wall flow filter of an oxidation catalyst consisting of platinum supported on alumina,
- a second dosing unit and
- a SCR catalyst comprising a commercially available flow through substrate of cordierite coated with a washcoat comprising iron-exchanged ß-zeolite.

The invention claimed is:

1. SCR catalyst comprising
a carrier substrate of the length L, which is a flow-through substrate, and
a coating A which comprises a small pore zeolite, copper, and palladium, and wherein coating A comprises palladium in an amount of 0.003 to 0.1% by weight based on the weight of the small pore zeolite and calculated as palladium metal,
wherein coating A extends only to a part of the length L. and
a coating B which comprises a small-pore zeolite and copper but is free from palladium, and
wherein coating A extends starting from one end of the carrier substrate to 10 to 80% of the length L. and coating B extends starting from the other end of the carrier substrate to 20 to 90% of the length L,
and wherein L is $L_A+L_B$ wherein La is the length of coating A and $L_B$ is the length of coating B.

2. SCR catalyst according to claim 1, wherein the small pore zeolite belongs to a framework type having the framework type code AEI, AFX, CHA, ERI, KFI or LEV.

3. SCR catalyst according to claim 1, wherein coating A comprises copper in an amount of 1 to 20% by weight based on the weight of the small pore zeolite and calculated as CuO.

4. SCR catalyst according to claim 1, wherein coating A comprises palladium in an amount of 0.04 to 0.1% by weight based on the weight of the small pore zeolite and calculated as palladium metal.

5. SCR catalyst according to claim 1, wherein coating A comprises cerium or cerium/zirconium mixed oxide in an amount of 10 to 80 g/L, respectively, based on the volume of the carrier substrate.

6. SCR catalyst according to claim 1, wherein coating A is present in an amount of 50 to 300 g/L, based on the volume of the carrier substrate.

7. SCR catalyst according to claim 1, wherein coating A comprises palladium in an amount of 0.06 to 0.08 wt % by weight based on the weight of the small pore zeolite and calculated as palladium metal.

8. SCR catalyst according to claim 1, wherein the small pore zeolite is SSZ-13.

9. SCR catalyst according to claim 1, wherein coating A comprises copper in an amount of 2 to 6% by weight based on the weight of the small pore zeolite and calculated as CuO.

10. SCR catalyst according to claim 1, wherein coating A and B only differ in the absence of palladium in coating B.

11. SCR catalyst according to claim 4, wherein the small pore zeolite belongs to a framework type having the framework type code AEI, AFX, CHA, ERI, KFI or LEV and has a SAR value of 5 to 50.

12. System comprising a SCR catalyst comprising
a carrier substrate of the length L, which is a flow-through substrate, and
a coating A which comprises a small pore zeolite, copper, and palladium in an amount of 0.003 to 0.1% by weight based on the weight of the small pore zeolite and calculated as palladium metal;
wherein coating A extends only to a part of the length L, and
a coating B which comprises a small-pore zeolite and copper but is free from palladium, and
wherein coating A extends starting from one end of the carrier substrate to 10 to 80% of the length L, and coating B extends starting from the other end of the carrier substrate to 20 to 90% of the length L,
and wherein L is $L_A+L_B$ wherein La is the length of coating A and $L_B$ is the length of coating B, and wherein coating A is arranged upstream and coating B is arranged downstream; and a dosing unit for reductant supply to the SCR catalyst.

13. Exhaust gas cleaning system comprising in the following order
a first dosing unit for reductant,
a first SCR catalyst comprising,
a carrier substrate of the length L, which is a flow-through substrate, and
a coating A which comprises a small pore zeolite, copper, and palladium in an amount of 0.003 to 0.1% by weight based on the weight of the small pore zeolite and calculated as palladium metal,
wherein coating A extends only to a part of the length L, and
a coating B which comprises a small-pore zeolite and copper but is free from palladium, and
wherein coating A extends starting from one end of the carrier substrate to 10 to 80% of the length L, and coating B extends starting from the other end of the carrier substrate to 20 to 90% of the length L.
and wherein L is $L_A+L_B$ wherein La is the length of coating A and $L_B$ is the length of coating B,
and wherein coating A is arranged upstream and coating B is arranged downstream,
a second dosing unit for reductant and a second SCR catalyst.

14. Exhaust gas cleaning system according to claim 13, further comprising a combined oxidation catalyst and particulate filter which combination forms a catalyzed particulate filter (cDPF) that is positioned between the first SCR catalyst and the second dosing unit.

15. Exhaust gas cleaning system according to claim 13, further comprising an oxidation catalyst upstream of the second dosing unit and wherein the second SCR catalyst is in the form of an SDPF.

16. Process for cleaning exhaust gas emitted from a lean burn engine and containing nitrogen oxides, which process comprises passing the exhaust gas stream through an exhaust gas cleaning system comprising in the following order a first dosing unit for reductant,
the SCR catalyst of claim 1 as a first SCR catalyst,
an oxidation catalyst,
a particulate filter,
a second dosing unit for reductant and
a second SCR catalyst.
wherein the first dosing unit for reductant and the first SCR catalyst are arranged close coupled and wherein the oxidation catalyst, the particulate filter, the second dosing unit for reductant and the second SCR catalyst are arranged underfloor and
wherein the exhaust gas enters the exhaust gas cleaning system before the first dosing unit for reductant and leaves it after the second SCR catalyst.

17. Exhaust gas cleaning system comprising in the following order
a first dosing unit for reductant,
a first SCR catalyst according to claim 1
an oxidation catalyst,
a particulate filter,
a second dosing unit for reductant and
a second SCR catalyst.

18. System according to claim 17, wherein coating A comprises copper in an amount of 2 to 6% by weight based on the weight of the small pore zeolite and calculated as CuO, and the palladium is in an amount of 0.04 to 0.1%.

19. SCR catalyst comprising
a carrier substrate of the length L, which is a flow-through substrate, and a coating A which comprises a small pore zeolite, copper and palladium, and wherein coating A comprises palladium in an amount of 0.003 to 0.1% by weight based on the weight of the small pore zeolite and calculated as palladium metal, wherein the carrier substrate comprises catalytically active coating B which comprises a small pore zeolite and copper and is free of palladium, and SCR, wherein coating A and coating B are the same but for coating B being free of palladium.

* * * * *